(12) United States Patent
Tegeder et al.

(10) Patent No.: US 10,723,627 B2
(45) Date of Patent: Jul. 28, 2020

(54) PRODUCTION OF ACTIVATED CARBON

(71) Applicant: Tigerstone Technologies Limited, London (GB)

(72) Inventors: Roland W. Tegeder, Woking (GB); Robert Blissett, Winchester (GB)

(73) Assignee: Tigerstone Technologies Limited, London (GB)

( * ) Notice: Subject to any disclaimer, the term of this patent is extended or adjusted under 35 U.S.C. 154(b) by 192 days.

(21) Appl. No.: 15/807,300

(22) Filed: Nov. 8, 2017

(65) Prior Publication Data

US 2019/0135639 A1 May 9, 2019

(51) Int. Cl.
*C01B 32/336* (2017.01)
*C01B 32/39* (2017.01)
*C01B 32/33* (2017.01)
*F23R 3/58* (2006.01)
*B04C 5/30* (2006.01)
*B04C 3/06* (2006.01)
*B04C 5/04* (2006.01)
*F23J 15/02* (2006.01)
*F23D 99/00* (2010.01)
*F23C 3/00* (2006.01)

(52) U.S. Cl.
CPC .............. *C01B 32/336* (2017.08); *B04C 3/06* (2013.01); *B04C 5/04* (2013.01); *B04C 5/30* (2013.01); *C01B 32/33* (2017.08); *C01B 32/39* (2017.08); *F23D 91/02* (2015.07); *F23J 15/027* (2013.01); *F23R 3/58* (2013.01); *F23C 3/006* (2013.01)

(58) Field of Classification Search
CPC ....... C01B 32/39; C01B 32/33; C01B 32/336; B04C 5/04; B04C 5/30; B04C 3/06; F23C 3/006; F23D 91/02; F23J 15/027; F23R 3/58
See application file for complete search history.

(56) References Cited

U.S. PATENT DOCUMENTS

| 2,257,907 | A | * | 10/1941 | Griswold | .............. C01B 32/336 502/431 |
| 7,771,668 | B2 | * | 8/2010 | Ohashi | .................. C01B 32/336 422/139 |
| 7,998,421 | B2 | | 8/2011 | Dodson | |
| 2007/0101912 | A1 | * | 5/2007 | Kohchi | ..................... C10B 7/00 110/229 |

(Continued)

FOREIGN PATENT DOCUMENTS

| EP | 0068853 A2 | 1/1983 |
| EP | 1897852 A1 | 3/2008 |
| JP | H02289412 A * | 11/1990 ........... C01B 32/336 |

(Continued)

*Primary Examiner* — Richard M Rump
(74) *Attorney, Agent, or Firm* — Christopher S. Dodson; Nexsen Pruet, LLC

(57) ABSTRACT

The disclosure provides a system and method for production of activated carbon from a coal-originating particulate feed material. Feed material and activating gas are introduced into a reaction chamber, the activating gas being introduced at a velocity above the average terminal velocity of particles within the feed material. Feed material is then entrained in the activating gas such that a recirculating flow path for the feed material is established within the reaction chamber. Activated material may then be recovered from the chamber.

39 Claims, 3 Drawing Sheets

(56) References Cited

U.S. PATENT DOCUMENTS

2013/0220790 A1    8/2013    Dodson

FOREIGN PATENT DOCUMENTS

| WO | 2006003454 A1 | 1/2006 |
| WO | 2006032919 A2 | 3/2006 |
| WO | 2006/063965 A1 | 6/2006 |
| WO | 2012073023 A1 | 6/2012 |
| WO | 2016042289 A1 | 3/2016 |
| WO | 2019092407 A1 | 5/2019 |

* cited by examiner

PRODUCTION OF ACTIVATED CARBON

FIELD

The present disclosure relates to methods for the activation of a carbon precursor that is coal or derives from coal.

BACKGROUND

Activated carbon is a form of carbon processed to create in it a large number of small and interconnected pores that increase the surface area available for adsorption or for chemical reactions. One exemplary use of activated carbon is removing, through adsorption, contaminant matter from water, other liquids, gases, earth and soil, etc. Activated carbon is usually produced from carbon rich structured biomass or coal material as precursors.

Carbon activation processes predominantly make use of two gasifying agents, carbon dioxide ($CO_2$) and water ($H_2O$), either in combination or alone. These reactants remove carbon atoms from the structure of the carbonaceous precursor material, in a way which increases the porosity of the material left behind. This happens according to the following two reactions:

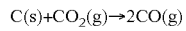

$$C(s) + CO_2(g) \rightarrow 2CO(g)$$

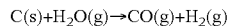

$$C(s) + H_2O(g) \rightarrow CO(g) + H_2(g)$$

Where no chemical activation agents are used, activated carbon production proceeds in a two-step process. In the first step (carbonisation), a carbonaceous precursor material is heated in the absence of oxygen to remove volatile organic compounds. In the second step (activation), the charred material from the first step is further heated in the absence of oxygen. For all prior art commercial production technologies, activation of carbon is carried out at high temperatures (800-1100° C.) over process times of hours. The duration of the activation step is chosen in line with desired targets for product yield and the degree of activation.

Production technologies and processes for activated carbon fall into three main types: rotary kilns, multiple hearth furnaces, and fluidized beds. The carbonisation and activation steps can be carried out in any combination of these reactor types according to product specification requirements.

In rotary kiln and multiple hearth furnace reactors, the reaction rates are slower and the equipment is larger and more expensive than for fluidised beds. Both technologies involve a complex assembly of moving parts.

Fluidised bed reactors create a bed of solid carbonaceous precursor particles that is supported by a (mostly upward) stream of activating gases so that the mixture of solid particles and gases behaves as a pseudo-fluid. Compared to the other commercial technologies for producing activated carbon, the conventional fluidised bed reactor provides much higher surface contact area and higher velocities between solid particles and process gas, exposes a larger proportion of the particles to the activating gas flow and promotes particle collisions with each other and with the wall of a reactor in which the fluidised bed is formed. All these effects promote improved heat and mass transfer rates and a reduction in required particulate residence times for activation.

However, the use of conventional fluidised beds for producing activated carbons suffers a fundamental limitation in that such beds can only operate with superficial gas velocities ($u_0$) (typically defined as the volumetric rate of gas flow divided by cross sectional area of the gas path) between certain defined limits. Firstly, the gas velocity must be higher than the velocity at which incipient fluidisation occurs (minimum fluidisation velocity, $u_{minf}$). Ratios of $u_0/u_{minf}$ up to around 10 are typically used in practice. Secondly, the superficial gas velocity must be below the velocity (referred to as the terminal velocity $u_t$ of a particle) at which the solid particles start to be entrained in the upwards gas flow and escape from the top of the vessel in which the fluidised bed is formed (elutriation, carryover). Gas velocities in excess of the terminal velocity may be used in fluidised beds, but this necessitates the use of external apparatus, for example a cyclone separator, to capture escaped particles and recirculate them through the reactor, which adds further plant complexity. The limits $u_{minf}$ and $u_t$ therefore generally define a practical operating window for a feed material with a given particle size distribution; this window is generally smaller for larger particles.

The practical limits on gas velocity and reaction temperature mean that there is limited scope to obtain significantly improved reaction rates or efficiency using conventional approaches.

As such, there remains an ongoing need to improve the efficiency and reduce the cost of the production of activated carbon. Moreover, while biomass materials can be and are routinely used as precursors for such production, coal and charcoal based feed material remains comparatively inexpensive, and there is accordingly a particular need to improve techniques for activation of such feed materials. Importantly, unlike biomass materials, there are no supply chain constraints on coal and charcoal feedstocks and they are widely available. This better supports the building of commercially sustainable business models.

SUMMARY

In accordance with an aspect of the disclosure there is provided a method of producing activated carbon from a coal-originating particulate feed material, the method comprising: introducing the feed material into a reaction chamber; introducing an activating gas into the reaction chamber at a velocity above the average terminal velocity of particles within the feed material; entraining the feed material in the activating gas within the reaction chamber such that a recirculating flow path for the feed material is established within the reaction chamber; and recovering the feed material from the chamber.

In accordance with a further aspect of the disclosure, there is provided a system for producing activated carbon from a coal-originating particulate feed material, system comprising: a reaction chamber; a feed material source configured to introduce the feed material to the reaction chamber; and an activating gas source configured to introduce an activating gas into the reaction chamber at a velocity above the average terminal velocity of particles within the feed material; and wherein the system is configured to entrain the feed material in the activating gas within the reaction chamber such that a recirculating flow path for the feed material is established within the reaction chamber, and the reaction chamber comprises one or more outlets for recovering the feed material.

It has been found that an effective process for obtaining activated carbon from coal or charcoal feed material can be achieved by ensuring that the feed material is exposed to a high velocity gas while at the same time retaining the feed material in a recirculating flow path within the chamber for adequate time for activation to take place. This residence time has been shown to be very short in comparison with the residence time required in conventional techniques. That is, significantly greater activation of feed material for a given residence time and reaction temperature has been achieved than would be expected given conventional approaches.

By adopting a recirculating flow path of the feed material contained within a reactor, limits on the gas velocity inherent in fluidised bed techniques are circumvented. It has been found that a much-increased gas velocity can enable a boundary layer thinning effect, whereby the thickness of a gas boundary layer, which typically surrounds particles in the feed material, is reduced. This allows greater effective contact between the activating gas and the particles within the feed material, increasing by orders of magnitude the frequency of reactions and thus the activation rate of carbon within the feed material.

The recovered activated feed material may have a BET surface area of at least 300 $m^2/g$, more preferably at least 500 $m^2/g$, more preferably at least 700 $m^2/g$. Accordingly, high quality activated material may be obtained for commercial applications.

Preferably, the activating gas generates a central vortex in the reaction chamber. This vortex can define at least part of the recirculating flow path of the feed material in such a way as to encourage activation of the feed material. In particular, particles of feed material, being entrained within the motion of the gas flow, are intimately mixed with the activating gas which can facilitate a high degree of activation.

In preferred embodiments, the activation gas is introduced into the reaction chamber with a gas velocity at least five times, more preferably at least ten times, greater than average terminal velocity of the particles of the feed material. In some instances, the average terminal velocity may be calculated as the terminal velocity of the median sized particle of the feed material. In some preferred embodiments, the activating gas is introduced into the reaction chamber at a velocity of between 18 and 25 times the terminal velocity of the median sized particle of the feed material. Higher gas velocities have been found to improve the reaction rates by enhancing the boundary layer stripping effect mentioned above.

Preferably, the reaction chamber is radially symmetric around a central axis. Moreover, the time averaged recirculation flow path of particles may be radially symmetric. Such a recirculation flow path of particles may be expressed as a two parameter locus defined by reference to height in the reactor and radial position. The reactor symmetry can avoid unwanted, unpredictable, chaotically turbulent or less controllable flow patterns or the development of hot spots and other unwanted effects associated with irregular geometries, thus reducing the risk of inconsistent or inhomogeneous carbon processing.

In preferred embodiments, the reaction chamber comprises a planar base, and the activating gas is introduced to the reaction chamber through the base. Preferably, the activating gas is introduced at an angle to the base. More preferably, the gas is introduced at an angle between 5° and 45° to the base. As such, the gas can be introduced in such a way as to provide an elevating force upon the particles within the feed material. In a particular embodiment, this angle is 15°. Preferably in this manner, or by alternative means, the flow path may be influenced such that it becomes a central gas vortex in which the particles are first entrained and then detached, notably through centrifugal forces or by other means, and then may become entrained again, thus creating and maintaining a corresponding recirculating flow pattern of the feed material within the reactor. Such a bulk flow pattern provides improves the retention of particles within the reactor and enables a higher degree of activation.

Preferably, the gas is introduced into the reaction chamber at an angle to a tangent to a circle centred on the central axis of the reaction chamber. The angle to the tangent may be between 10° and 75° and in a preferred embodiment is 30°.

The activating gas may comprise at least one of air, steam, carbon monoxide or nitrogen. In preferred embodiments, the gas enters into the reaction chamber at a temperature of 600-1200° C., more preferably 800-1000° C. It has been found that at such process temperatures significant yield can be achieved in a very short period of time.

In some embodiments, the feed material has not been devolatilised prior to introduction into the reaction chamber. This is due to the effectiveness of the reaction process, which is able to combine a process of devolatisation with activation without introducing unwanted delay. In alternative approaches, the feed material may be devolatilised prior to introduction to the reaction chamber.

The process comprises recovering activated feed material from the reaction chamber via elutriation or by other means. The mean period of time that the particulate material stays in the reactor can be termed the residence time, and in preferred examples it is less than ten minutes, more preferably less than five minutes and in a particular embodiment it is approximately 60 seconds. Such short residence times contrast markedly with alternative commercial techniques in which residence times are typically at least a few hours. In preferred embodiments both the introduction of feed material and recovery of activated feed material are carried out continuously. Alternatively, one or both of these processes may be carried out in discrete steps; for example, feed material may be introduced or recovered in bulk.

BRIEF DESCRIPTION OF THE DRAWINGS

Exemplary embodiments of the disclosure shall now be described with reference to the drawings in which.

Throughout the description and the drawings, like reference numerals refer to like parts.

SPECIFIC DESCRIPTION

Figure 1:
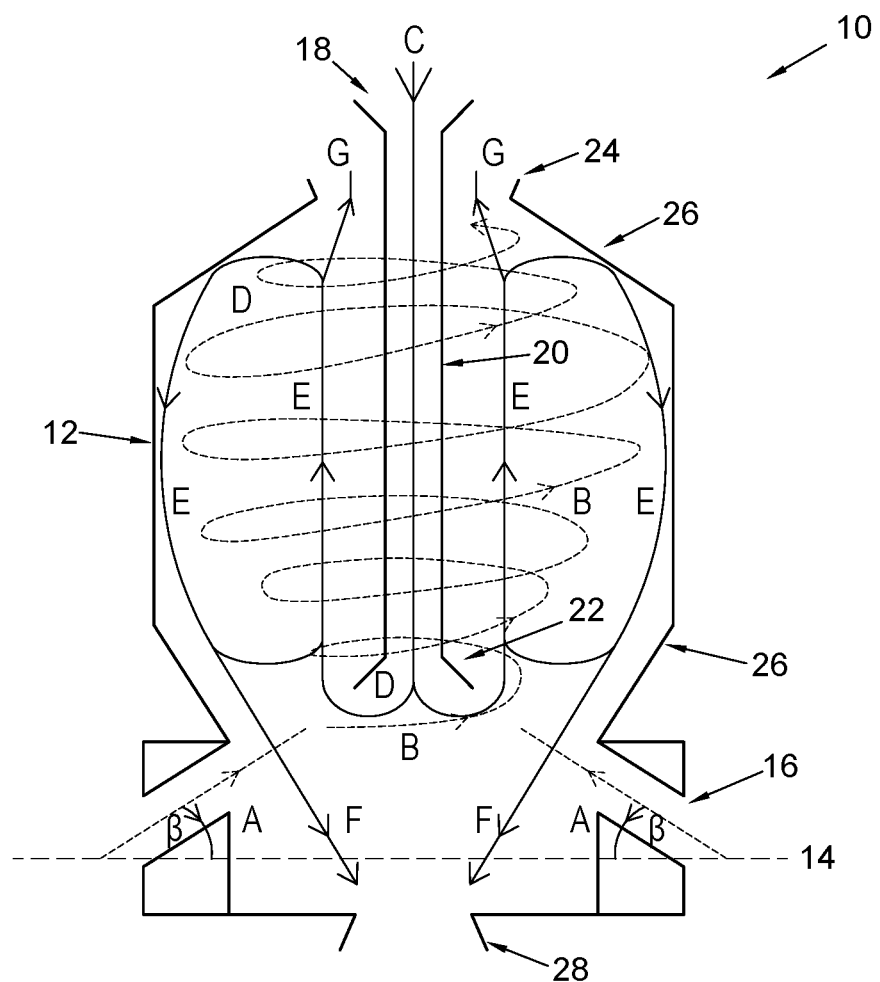
FIG. 1 shows a reactor according to the disclosure, illustrating both gas a particulate flow.

Reference is first made to FIG. 1 to describe a reactor 10. The reactor 10 comprises a radially symmetric reaction chamber 12 inside of which a processing zone is formed. The processing zone is annular in shape and extends co-axially with the chamber 12. Particulate feed material is introduced into the reaction chamber 12 through a radially symmetric material intake 18.

In operation, the feed material falls down a feed tube 20 to exit annularly at a flared bottom outlet 22. The outlet 22 is coincident with a central axis of the reaction chamber 12. The outlet distributes the feed material symmetrically into the reaction chamber 12. The feed material outlet 22 is located in the reaction chamber 12 and is provided to mix the incoming feed material both with flowing gas and with feed material that has been recirculated to the bottom of the reactor and re-entrained in the gas flow, as will be described.

The chamber 12 extends vertically about a central axis that is also the axis of the feed tube 20 and the processing zone. Tapered sections 26 of the chamber 12 are provided at the top and bottom of the chamber 12, separated by a broadly cylindrical portion. The tapered sections 26 are frustoconical, tapering towards the centre of the reactor 10. At the bottom of the chamber, an annular gas inlet 16 is provided. Gas is introduced into the reactor 10 through this inlet 16 at the base of the lower tapered section 26. The gas introduced into the reactor 10 may, for example, be air, steam, carbon monoxide and/or nitrogen.

Below the annular inlet 16 is a bottom reactor discharge 28. This discharge may allow particulate matter within the reaction chamber 12 that does not become entrained in the gas flow to be removed from the chamber 12. At the top of the chamber is an upper reactor discharge 24 through which particulate matter, together with process gas or gases, may be removed from the reaction chamber.

Once introduced, the gas follows a vortex flow path (described in more detail below) within the reactor chamber 12. The gas may be introduced through any appropriate guiding means to control the direction of the gas flow. For example, vanes (not shown) may be provided to direct the gas flow along the gas flow path. An example structure of vanes suitable for use in a reaction chamber of this type is described in U.S. Pat. No. 7,998,421. The vanes can be replaced by any suitable structure that will create a desired flow. For instance, a series of annular nozzles arranged to point in the required directions can give a similar result.

Other radially symmetric reactors could also be used. Using a reactor 10 that is generally symmetric about a central axis ensures that a uniform temperature profile is provided in the reaction chamber 12. This is achieved without the use of additional burners and steam injection lances. Such a radially symmetric design for the reactor 10, as well as the gas inlet 16 and the feed tube outlet 22 reduces formation of localised temperature excursions from a desired temperature set point ('hot spots') in the reaction chamber 12. Hot spots generally impact product quality adversely, causing over- or under-activation of the feed material. Hot spots also increase the probability that inorganic matter (ash) among the precursor materials melt, potentially causing a cleaning and maintenance problem. Furthermore, the use of a generally symmetric reactor 10 means that reliability of mixing is increased and the overall process stability is improved The reactor 10 also has no moving parts in contrast to other known reactor types. This reduces ongoing equipment maintenance. It also reduces the likelihood for uncontrolled fouling in any part of the equipment.

Figure 2:
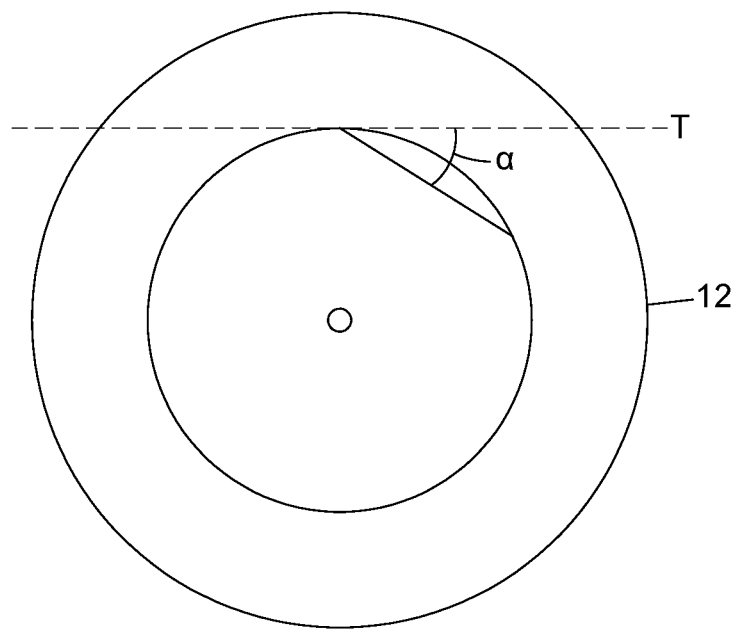
FIG. 2 shows a cross section through the reactor of FIG. 1.

In some embodiments, the gas inlet 16 and guides cause the gas to enter the processing zone at an angle $\beta$ inclined upwardly with respect to a horizontal plane 14. The angle $\beta$ is approximately 15° in this embodiment. Furthermore, the means of guiding the gas may direct the gas flow so that it enters the processing zone at an angle $\alpha$ with respect to a tangent T of the substantially circular transverse cross-section of the processing zone, as shown in FIG. 2. The angle $\alpha$ is approximately 30° in this embodiment. It will be appreciated that any appropriate angle can be used. Preferably, the angle relative to the tangent to the radial line at the point of entry ($\alpha$) is larger than 10° but less than 75° and the angle relative to the horizontal plane ($\beta$) is greater than 5° but less than 45°.

FIG. 1 shows a gas flow path inside the reactor 10 which can be understood with reference to labels A and B. FIG. 1 further shows the flow of the particulate feed material within the reaction chamber 12 which can be understood with reference to labels C, D, E, F and G.

When the gas is introduced into the reactor 10 it is introduced along path A, in the illustrated case that path is defined by the adoption of $\alpha$ as 30° and $\beta$ as 15°. By controlling the angle of entry of the gas into the processing zone to maintain it within the bounds discussed above ($10°<\alpha<75$; $5°<\beta<45°$), the gas flow can be made to rotate about the central axis of the reactor to generate a central vortex B within the reaction chamber. The gas may then leave the reaction chamber through upper discharge 24. In some embodiments, the processing zone can also be subjected to an outer vortex created by gas supplied from a second gas inlet, as described in PCT/CA01/01852.

Feed material is introduced through feed tube 20 into the reaction chamber 12. The feed material enters the entrainment zone D and becomes entrained in the central vortex B, to travel upwardly and move radially outwardly due to centrifugal force. A proportion of the feed material then falls downwardly in the chamber 12 before being re-entrained in the gas flow. This establishes a recirculating flow path E for the feed material within the chamber. It will be understood that the rotational nature of gas flow path B may result in at least part of the recirculating flow path for the feed material being approximately helical.

Particulates may be removed from the reaction chamber 12 in a number of ways. In one case, if the particles are light enough, they are carried out of the top of the reaction chamber along path G. In another case, they are discharged at the bottom of the reaction chamber 12 along path F.

It has been found that use of such a reactor provides an unforeseen efficiency improvement in the production of activated carbon from the feed material. This activated feed material is typically recovered from the upper discharge 24 along path G. As will be discussed, the use of the reactor 10 allows higher gas velocities than previously envisaged to be used, significantly reduces residence times required to produce activated carbon of the requisite porosity and provides activated carbon of more uniform porosity.

Figure 3:
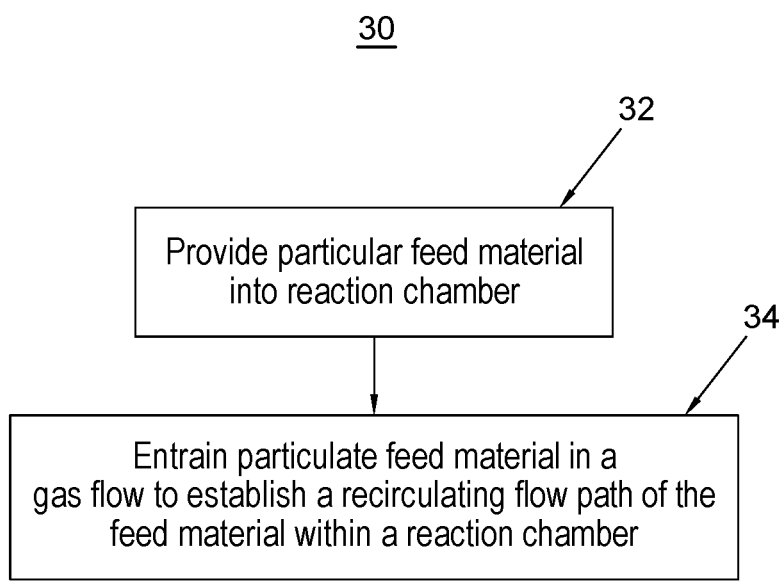
FIG. 3 shows a method of producing activated carbon from coal according to the disclosure.

A method 30 for producing activated carbon from a coal, or coal derived material according to an embodiment is shown in FIG. 3.

At step 32, coal, or coal derived material is introduced into the reactor 10 as a feed material. The feed material may be coal or charcoal based. For example, the feed material may be lignite. Alternatives may include bituminous and sub-bituminous coal or anthracite. The coal precursor material may be devolatilised before introduction to the reactor, or raw precursor material could be used, as will be discussed below. Other suitable reaction chambers could be used, which may be symmetrical about a central axis and/or generally cylindrical and which allow gas velocities in excess of that required to achieve substantial particle boundary layer thinning.

At step 34, an activating gas is introduced into the reactor 10. As described above, the gas is introduced in such a manner as to generate a vortex B into which the coal and/or charcoal particles are entrained to establish the recirculating flow path E within the reaction chamber 12. In some embodiments, the gas is steam, carbon monoxide and/or nitrogen. In this embodiment, the gas is introduced from the bottom of the reaction chamber. The gas is introduced upwardly at an angle to the horizontal, for example between 5° and 45°, and inwardly at an angle to a tangent of walls of the reaction chamber, for example at an angle between 10° and 75°. While this particular range of orientations has been found to provide excellent results, other gas introduction regimes are possible that generate high velocity gas conditions that allow a stable recirculating bulk particle flow pattern to form.

In this embodiment, the velocity of the gas flow is controlled such that it is greater than the terminal velocity $u_t$ of the particulate coal precursor material. This enables the initial entrainment of particles in the upward gas flow. In one embodiment, while the average superficial velocity of the gas though reaction chamber $u_0$ is about 2-12 m/s, the velocity of the activating gas at the inlets is far higher. This creates an intense and radially symmetric heat and mass transfer zone due to the effect of the gas velocity on the mass and heat transfer coefficients.

As discussed in relation to FIG. 1, the introduction of the gas in this embodiment also produces a two-phase flow comprising the coal feed material and the activating gas. Particles are introduced into the reaction chamber, and are entrained in the central gas vortex which throws them radially outwards such that they detach from the upwards flow and recirculate within the reactor. In this way, the process gas and the coal particulate materials interact, and the precursor material is processed into activated carbon.

The activated carbon can then be recovered from the reactor 10. Either the particles are elutriated from the top of the reactor and collected in a suitable apparatus, or they are discharged naturally from a central outlet at the bottom of the reactor 10 in a continuous manner.

Implementing the carbon activation process shown in FIG. 3 has several effects. Principally, as the particles entrained along the central helical part of flow path E are propelled radially outwardly and then fall downwardly, fewer particles escape from the top of the reactor. As discussed above, in known fluidised bed implementations, the velocity of the activating gas flow is limited by the velocity of the particles that will result in them escaping from the reactor. By creating an inner gas vortex, a particle separation mechanism is established, and higher gas velocities can be employed before particle carryover becomes a significant issue. The time-averaged bulk particle flow path in the reactor is thus recirculating, stable and repeatable.

By increasing the gas velocity at the gas inlet, ratios between the superficial velocity in the reactor $u_0$ and the minimum fluidisation velocity $u_{minf}$ of well over 1000 can be achieved. As discussed above, a ratio of $u_0/u_{minf}$ of around 10 is considered in the art as the maximum that can be achieved in a fluidised bed reactor. The method 30 of activating carbon in the reactor 10 therefore operates in a completely different flow regime to fluidised beds known in the art that do not carry over particles.

Furthermore, in a particular embodiment, ratios of the superficial velocity in the reactor $u_0$ and the terminal velocity of particles $u_t$ of between 18 and 25 can be achieved. These velocities are in the range that produce the intense heat and mass transfer zone described previously, and the recirculating particulate flow regime ensure that external equipment for capturing escaped particles is not required.

The higher process gas velocities provide for a processing environment that allows boundary layers around carbon particles to be stripped much more effectively. The boundary layer is a comparatively stagnant layer of gas that encapsulates each particle. Depending on the relative rates of diffusion of the reacting gas through this layer and reaction at the particle surface, it can result in a lower concentration of the gas at the particle surface than outside the boundary layer. Reducing the thickness of the boundary layer in this case increases the concentration of reacting gas at the surface, and therefore increases the reaction rate much beyond what could practically be achieved through changes of reaction temperature. Consequently, the time it takes to activate the carbon to a designated level of porosity is reduced. Reduced carbon particle residence times allow for the provision of more compact process equipment.

The central gas vortex also allows particle elutriation at higher process gas velocities to be effectively controlled and internalised. Therefore, smaller particle sizes of the precursor material can be processed without unwanted expulsion of such particles from the reaction chamber. For smaller particles, the temperature or mass gradients from the particle surface to its interior are flattened, and thus diffusion limitations to the activation process, and subsequently the time required to activate carbon to a specified degree, are reduced.

The central gas vortex means that the processing zone contains a rapidly and uniformly tangentially circulating mass of particulate material, evenly distributed in the processing zone. This ensures that all of the particles in the bed are exposed to the processing gases to provide for uniform and rapid processing of the particles of the feed material. The predictable recirculating bulk flow pattern of the feed material allows the reactions in the reactor 10 to be carefully controlled. This increased process controllability allows the production of activated carbons that differ as to their specific adsorptive affinities and efficiencies to be produced.

The tangential motion of the gas in the processing zone also provide particles of the feed material with a centrifugal force that drives larger (heavier) particles towards the appropriately shaped reactor walls, thus ensuring that larger particles participate in the internal particle recirculation loops and remain in the reactor for longer. As larger carbonaceous particles require longer exposures to heat treatment, to allow for heat to diffuse into the particle interior and promote activation, whereas smaller particles are less diffusion limited, this leads to more even activation degrees across particles of varying sizes and the process is self-regulating.

In some embodiments, a dedicated burner may be located external to the reactor 10 to combust a portion of the devolatilization gases that are produced during the activation reaction. This allows the reactor to be operated with a lower oxygen limit of practically zero. An example of such a process can be understood with reference to FIG. 4, in which a system providing an external burner is illustrated. As can be seen from this Figure, a pre-burner 40 may act as the external burner, receiving both fresh activating gas 42 and recycled volatile gas 44. After combustion of the gas mix it is introduced to the reaction chamber 12. A gas cyclone 46 may be coupled to the outlet of the reaction chamber 12 in order to separate the mixture of activated carbon and volatile gases received therefrom. Not all volatile gases are recirculated, and some may be expelled for combustive use elsewhere, such as generating electricity to sustain the electricity requirement of the embodiment.

Figure 4:
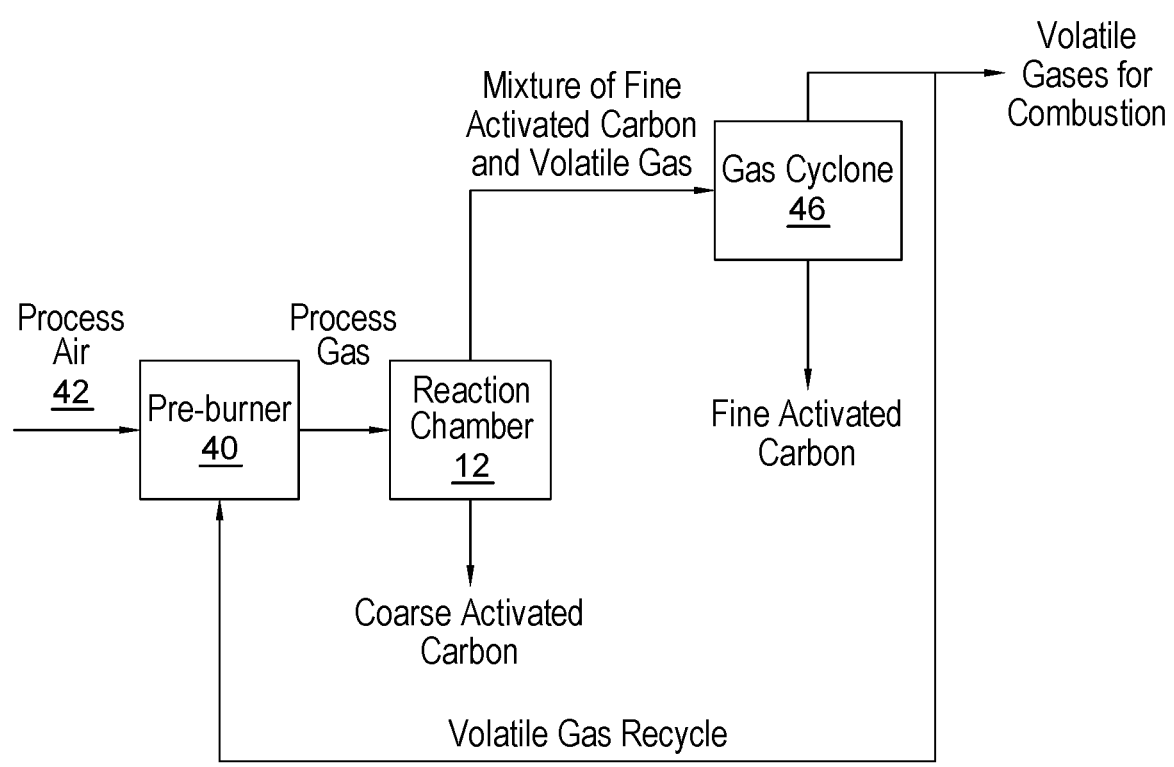
FIG. 4 shows a schematic representation of a gas recycling path for the reactor.

While preferred embodiments will adopt a recycling path such as that shown in FIG. 4 for the volatile gases, it will be recognised that the pre-burner 40 is not essential. Another option is to combust the gases inside the reactor 10 itself. However, by adopting a pre-burner, a low/zero oxygen activating gas may be provided to the main reaction chamber 12, minimising the possibility that the fine coal/carbon particles within the chamber 12 are partially oxidised by the oxygen in the gas stream which can reduce the yield and the quality of the activated carbon. In this process, the activating gas may be raised to a temperature higher than the reactor set-point; as it enters the reactor it is cooled by the coal particulates to the reactor set-point.

As discussed above, known carbon activation processes relying solely on thermal activation (as opposed to activating with chemical reagents) require a two-step procedure to be employed—carbonisation and activation. Due to the improved reaction rate that leads to its increased efficiency, the current process allows raw precursor material to be inserted into the reactor to produce the activated carbon, reducing the process to a single step.

These various advantages result in a carbon activation process that is significantly improved over those known in the art. Using this process, activated carbon with the requisite surface area, and hence porosity, has been achieved at temperatures as low as 680° C. (compared to conventional activation processes that require temperatures of 900-1100° C.). In this case, the high heat and mass transfer conditions experienced have shifted the temperature window of activation downwards. The estimated residence time of coal feed material particles has been reduced to the order of seconds. This time scale is orders of magnitude below that of prior art processes which require residence times of around one hour or more for adequate carbon activation.

The comparatively low mass of particles in the reactor generates a low pressure drop in the activating gas flow, which allows gases from which the carbon particles have been effectively separated to be recirculated and combusted in-situ to provide energy for the carbon particle activation. The excess energy leaving the reactor in the form of hot process gas can be used for the pre-drying of the coal. In this configuration, the energy demands of the process may be met solely from the volatile organic materials that are driven from the organic precursor material and as such the process is self-sustaining. Such an improvement of the energy efficiency of the process has a direct beneficial impact on the operating and environmental costs.

The comparatively short residence times relative to standard production methods mean that the thermal mass to be maintained at the required operating temperature is smaller, and requires less energy than other larger reactor technology. It is much harder to recirculate the volatile gases in other processes. In conventional fluidised beds, the pressure drop of gas flowing through the bed is much greater than for the disclosed process because the mass of bed material is necessarily larger; this imposes the necessity to use a much larger and less economical fan.

An example of the improvements in the production of activated carbon are detailed below, using a lignite precursor material. An Australian lignite with the proximate analysis provided in Table 1 was screened to a particle size of less 6 mm and then dried to approximately 30% moisture. A series of activation trials were undertaken on the screened coal in a reactor such as reactor 10 described above having diameter of 400 mm.

TABLE 1

| | |
|---|---|
| Total Moisture (as received) | 63.9% |
| Fixed Carbon (proximate analysis) (db) | 41.9% |
| Volatiles (proximate analysis) (db) | 54.9% |
| Ash (proximate analysis) (db) | 3.2% |

The experimental operating parameters of the activation trials are provided in Table 2. Reactions were performed at five different temperatures between 650° C. and 840° C. Each reaction had a corresponding flow rate of primary input air, ranging from 241 kg/s to 316 kg/s.

TABLE 2

| Temp. (° C.) | Recycle Flow (kg/s) | Primary Air Flow (kg/s) | Solids Flow (kg/hr) |
|---|---|---|---|
| 650 | 150 | 241 | 60 |
| 681 | 153 | 284 | 60 |
| 730 | 146 | 285 | 60 |
| 782 | 149 | 276 | 60 |
| 840 | 152 | 316 | 60 |

Two carbon products were generated, a coarse sample representing the majority of the coal with particle sizes exceeding 150 µm and a fine sample with particle sizes below 150 µm. It is the fine sample that is pertinent to the process of activation as it is in the size range where activation on the timescales reported here is not diffusion limited. Table 3 shows some other pertinent results of these trials.

TABLE 3

| Temp. (° C.) | $u_0/u_{minf}$ | $u_0/u_t$ | BET surface area (m$^2$/g) |
|---|---|---|---|
| 650 | 1531 | 18 | 379 |
| 681 | 1601 | 18 | 440 |
| 730 | 1716 | 20 | 483 |
| 782 | 1835 | 21 | 524 |
| 840 | 2249 | 25 | 624 |

The ratio between the superficial velocity in the reactor ($u_0$) and the minimum fluidisation velocity ($u_{minf}$) for a lignite particle of 100 µm ranges from 1531 at the lowest temperature to 2249 at the highest temperature. These ratios are far in excess of those previously considered common in the art ($u_0/u_{minf}$=10). As discussed above, a ratio of 10 is considered in the art as the maximum that can be achieved in a fluidised bed reactor. The process of activating carbon in the reactor 10 therefore operates in a completely different flow regime to fluidised beds known in the art that do not carry over particles.

The ratio between the superficial velocity in the reactor ($u_0$) and the terminal velocity ($u_t$) of a single particle ranges between 18 and 25.

Activated carbon particles produced at temperatures as low as 680° C. with surface areas above 400 m$^2$/g are considered acceptable in the industry. The high heat and mass transfer conditions experienced in this process type has have shifted the temperature window of activation downwards.

The estimated residence time of coal particles in the trials (based on the reactor bed containing 1 kg of solid at any one time) was 60 seconds. This time scale is orders of magnitude below that of prior art processes which require activation residence times of around one hour or more.

Variations or modifications to the disclosure will be apparent to the skilled person. Such variations and modifications may involve equivalent and other features which are already known and which may be used instead of, or in addition to, features described herein. Features that are described in the context of separate examples may be provided in combination in a single embodiment. Conversely, features which are described in the context of a single example may be also provided separately or in any suitable sub-combination.

The invention claimed is:

1. A method of producing activated carbon from a coal-originating particulate feed material, the method comprising:

introducing the feed material into a reaction chamber;
introducing an activating gas into the reaction chamber at a velocity above the average terminal velocity of particles within the feed material;
entraining the feed material in the activating gas within the reaction chamber such that a recirculating flow path for the feed material is established within the reaction chamber; and
recovering activated feed material from the chamber,
wherein the activating gas is introduced into the reaction chamber with a gas velocity greater than five times the average terminal velocity of the particles of the feed material.

2. A method according to claim 1, wherein the activating gas is introduced into the reaction chamber with a gas velocity greater than ten times the average terminal velocity of the particles of the feed material.

3. A method according to claim 1, wherein the activating gas generates a vortex within the reaction chamber.

4. A method according to claim 1, wherein at least part of the recirculating flow path of the feed material is approximately helical.

5. A method according to claim 1, wherein the reaction chamber is radially symmetric around a central axis.

6. A method according to claim 1, wherein the feed material is recovered from the reaction chamber after an average residence time that is less than ten minutes.

7. A method according to claim 1, wherein the temperature within the reaction chamber is in the range of 600-1200° C.

8. A method according to claim 1, wherein the activating gas is introduced into the reaction chamber at an angle of between 5° and 45° to a base of the reaction chamber.

9. A method according to claim 1, wherein the activating gas is introduced into the reaction chamber at an angle of between 10° and 75° to a tangent to a circle centred on a central axis of the reaction chamber.

10. A method according to claim 1, wherein the step of recovering the feed material comprises a process of elutriation.

11. A method according to claim 1, wherein the feed material is recovered from the reaction chamber after an average residence time that is less than five minutes.

12. A method according to claim 1, wherein the feed material is recovered from the reaction chamber after an average residence time that is less than 60 seconds.

13. A method according to claim 1, wherein the temperature within the reaction chamber is in the range of 800-1000° C.

14. A method of producing activated carbon from a coal-originating particulate feed material, the method comprising:
introducing the feed material into a reaction chamber;
introducing an activating gas into the reaction chamber at a velocity above the average terminal velocity of particles within the feed material;
entraining the feed material in the activating gas within the reaction chamber such that a recirculating flow path for the feed material is established within the reaction chamber; wherein at least part of the recirculating flow path for the feed material is approximately helical; and
recovering activated feed material from the chamber,
wherein the gas is introduced upwardly at an angle inclined to the base of the reaction chamber.

15. A method according to claim 14, wherein the activating gas is introduced into the reaction chamber with a gas velocity greater than five times average terminal velocity of the particles of the feed material.

16. A method according to claim 14, wherein the activating gas is introduced into the reaction chamber with a gas velocity greater than ten times average terminal velocity of the particles of the feed material.

17. A method according to claim 14, wherein the activating gas generates a vortex within the reaction chamber.

18. A method according to claim 14, wherein the reaction chamber is radially symmetric around a central axis.

19. A method according to claim 14, wherein the feed material is recovered from the reaction chamber after an average residence time that is less than ten minutes.

20. A method according to claim 14, wherein the temperature within the reaction chamber is in the range of 600-1200° C.

21. A method according to claim 14, wherein the activating gas is introduced into the reaction chamber at an angle of between 5° and 45° to a base of the reaction chamber.

22. A method according to claim 14, wherein the activating gas is introduced into the reaction chamber at an angle of between 10° and 75° to a tangent to a circle centred on a central axis of the reaction chamber.

23. A method according to claim 14, wherein the step of recovering the feed material comprises a process of elutriation.

24. A method according to claim 14, wherein the feed material is recovered from the reaction chamber after an average residence time that is less than five minutes.

25. A method according to claim 14, wherein the feed material is recovered from the reaction chamber after an average residence time that is less than 60 seconds.

26. A method according to claim 14, wherein the temperature within the reaction chamber is in the range of 800-1000° C.

27. A method of producing activated carbon from a coal-originating particulate feed material, the method comprising:
introducing the feed material into a reaction chamber;
introducing an activating gas into the reaction chamber at a velocity above the average terminal velocity of particles within the feed material;
entraining the feed material in the activating gas within the reaction chamber such that a recirculating flow path for the feed material is established within the reaction chamber; and
recovering activated feed material from the chamber,
wherein the activating gas generates a vortex within the reaction chamber.

28. A method according to claim 27, wherein the activating gas is introduced into the reaction chamber with a gas velocity greater than five times average terminal velocity of the particles of the feed material.

29. A method according to claim 27, wherein the activating gas is introduced into the reaction chamber with a gas velocity greater than ten times average terminal velocity of the particles of the feed material.

30. A method according to claim 27, wherein at least part of the recirculating flow path of the feed material is approximately helical.

31. A method according to claim 27, wherein the reaction chamber is radially symmetric around a central axis.

32. A method according to claim 27, wherein the feed material is recovered from the reaction chamber after an average residence time that is less than ten minutes.

33. A method according to claim 27, wherein the temperature within the reaction chamber is in the range of 600-1200° C.

34. A method according to claim 27, wherein the activating gas is introduced into the reaction chamber at an angle of between 5° and 45° to a base of the reaction chamber.

35. A method according to claim 27, wherein the activating gas is introduced into the reaction chamber at an angle of between 10° and 75° to a tangent to a circle centred on a central axis of the reaction chamber.

36. A method according to claim 27, wherein the step of recovering the feed material comprises a process of elutriation.

37. A method according to claim 27, wherein the feed material is recovered from the reaction chamber after an average residence time that is less than five minutes.

38. A method according to claim 27, wherein the feed material is recovered from the reaction chamber after an average residence time that is less than 60 seconds.

39. A method according to claim 27, wherein the temperature within the reaction chamber is in the range of 800-1000° C.

* * * * *